April 8, 1969     T. R. LA VALLEE     3,437,856
CONTROL SYSTEM FOR CONSTANT LEVEL FLYWHEEL ENERGY BOLSTER PRESS
Filed Oct. 28, 1964
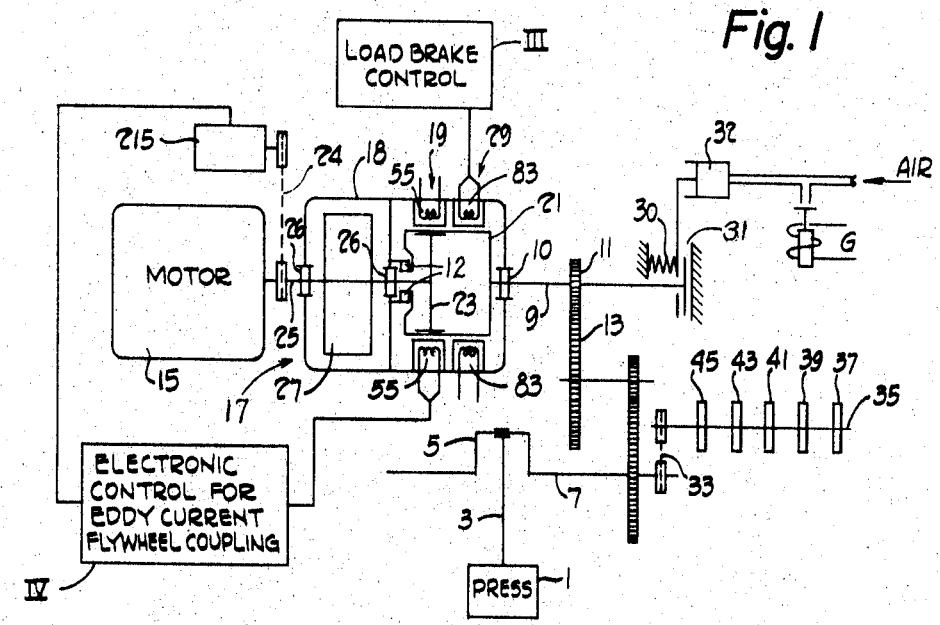
Fig. 1
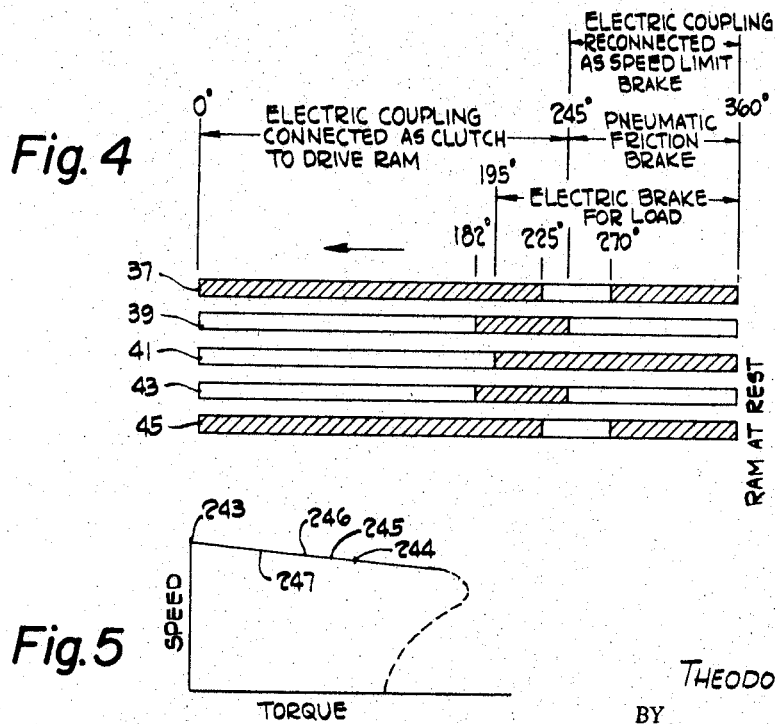
Fig. 4
Fig. 5
INVENTOR.
THEODORE R. LA VALLEE
BY
Schramm, Kramer & Sturges
ATTORNEYS.

INVENTOR.
THEODORE R. LaVALLEE

United States Patent Office 3,437,856
Patented Apr. 8, 1969

3,437,856
CONTROL SYSTEM FOR CONSTANT LEVEL
FLYWHEEL ENERGY BOLSTER PRESS
Theodore R. La Vallee, Detroit, Mich., assignor to Eaton
Yale & Towne Inc., a corporation of Ohio
Filed Oct. 28, 1964, Ser. No. 407,042
Int. Cl. H02p 15/00
U.S. Cl. 310—94                    5 Claims

ABSTRACT OF THE DISCLOSURE

A press drive system which includes a press, a flywheel driven by a prime mover, such as an A.C. motor, and an eddy-current coupling interposed between the flywheel and the press for driving the press by the flywheel, a speed responsive device, such as a tachometer generator connected to the flywheel producing a signal which is proportional to the speed of the flywheel, the output of the speed responsive device being applied to the eddy-current coupling whereby the speed of the flywheel is maintained substantially equal to a predetermined level when the press is disconnected from the flywheel.

---

This invention relates to speed and energy control and concerns particularly the maintenance of constant level flywheel energy.

An object of the invention is to improve the operation of apparatus in which the kinetic energy of a flywheel is employed to provide power and particularly to achieve precision in the operation of such apparatus by maintaining flywheel energy at a constant value between working cycles.

Squirrel cage induction motors are customarily used in driving forming presses and similar apparatus, and flywheels are used on the motor shafts to supply the relatively large amount of energy which is required during the relatively short period of time while the puch is contacting the work and driving it into the die. The power output of induction motors varies with the slip. Although the speed-torque curve is relatively flat it necessarily slopes downward with increasing load; and in order to perform work the induction motor must run at somewhat less than synchronous speed, that is with some slip. On the other hand it approaches synchronous speed when running idle so that greater kinetic energy is stored in the flywheel when the motor is running idle than when it is continuously performing work.

This poses a problem on mechanical stamping presses. The direct coupled or belted flywheel used as an energy reservoir with such a motor changes the amount of stored energy as a square of the speed change. Modern production presses, particularly those of the moving bolster design, are difficult to stop accurately because of this energy variation. In many cases, the variation is of the order of 20%. As a result, the first stroke, made after an idle period, results in over travel which may be disastrous to the work piece or closely timed automation.

It is accordingly an object of the invention to provide a self-contained, automatically compensated, control system to main the flywheel speed at a predetermined adjustable speed to overcome this natural characteristic of the driving motor.

The punch motion of a mechanical stamping press approximates harmonic motion. A sine wave describes the motion, which reverses direction at top and bottom center. Depending upon the press design, one of these two points is used as zero on the press. On a standard single-action machine of this type very little punch displacement is achieved at 15° either side of the center or zero position. The advent of the moving bolster press presented a new problem. Even with a single action press, both the punch and bolster moved. The work is done roughly at the vertical center position of the press. The punch motion is as already described, but it travels only about half the normal distance. The bolster movement, however, functions exactly as the blank holder in a standard double action press. It must complete its upper motion at about 100° of crank movement. At that position it dwells while the punch does its work. Then the bolster is retracted to bottom position. Depending upon the required press opening, for automation, or other reasons, the bolster may start the upward motion before reaching zero crank position. The timing between the punch and the bolster motion is fixed by gears or links and cannot be altered.

Because of the foregoing operation the bolster moves a considerable amount for crank shaft degree of rotation. On such a press, geared for high production, a severe problem is created. On single stroke operation the press must stop very close to zero degrees position each time. Otherwise the automation, particularly if it is figured close, does not have mechanical clearance, and destroys the piece part or itself.

On this design of press, as on many conventional designs, the drive system consists of an alternating-current squirrel cage induction motor, an eddy-current flux coupling press drive and an air operated friction safety brake. The press is designed to operate on a single stroke basis at a uniform number of strokes per minute. The flywheel slows down to furnish energy for each stroke and the motor builds up the speed again. The speed fluctuation is uniform for each stroke. On this basis the press is timed to stop at zero crank position. Now if the press is stopped, the motor continues to drive the flywheel. After a few minutes the motor flywheel approaches the synchronous motor speed. The excess energy is syphoned off once the press is put back to work without any particular trouble. On a moving bolster press, however, the overshoot carries the stopping points sufficiently beyond zero degrees to create problems.

It is accordingly an object of the invention to prevent the motor and flywheel of a stamping press from attaining a speed, even when idling substantially exceeding the normal working maximum speed of the motor. Other and further objects, features and advantages of the invention will become apparent as the description proceeds.

In accordance with the invention the motor and flywheel speed are controlled to maintain the kinetic energy at a constant level. Therefore, the first stroke after an idle period draws exactly the same stored energy as the fifteenth single stroke. This is a big step in achieving repeatability of stopping position.

To achieve this control a speed signal from the motor or flywheel is introduced in a control for an eddy current clutch or coupling connected while the load is braked mechanically for slowing down the flywheel when it exceeds a predetermined speed for which it is set. Provision for adjustment of the set speed may be made; then the correction is automatic or self compensating. A small amount of continuous dissipation required by the eddy current coupling will not injure the coupling. Conversely the eddy current coupling coils and the cooling oil are, to a degree, stablized as a result. The reaction is taken by the mechanical friction holding brake.

In achieving this control a speed signal from the motor or flywheel is introduced on the grid of a thyratron used for clutch excitation.

A better understanding of the invention will be afforded by the following detailed description considered in conjunction with the accomanying drawings in which:

FIG. 1 is a schematic diagram of an embodiment of the invention.

FIG. 4 is a developed diagrammatic view of a group of cam operated switches associated with the press, and FIG. 5 is a graph illustrating the speed-torque or speed-load characteristics of motors used in driving flywheel connected presses and other loads in which the torque fluctuates greatly during an operating cycle.

Like reference characters are utilized throughout the drawings to designate like parts.

Figure 2:
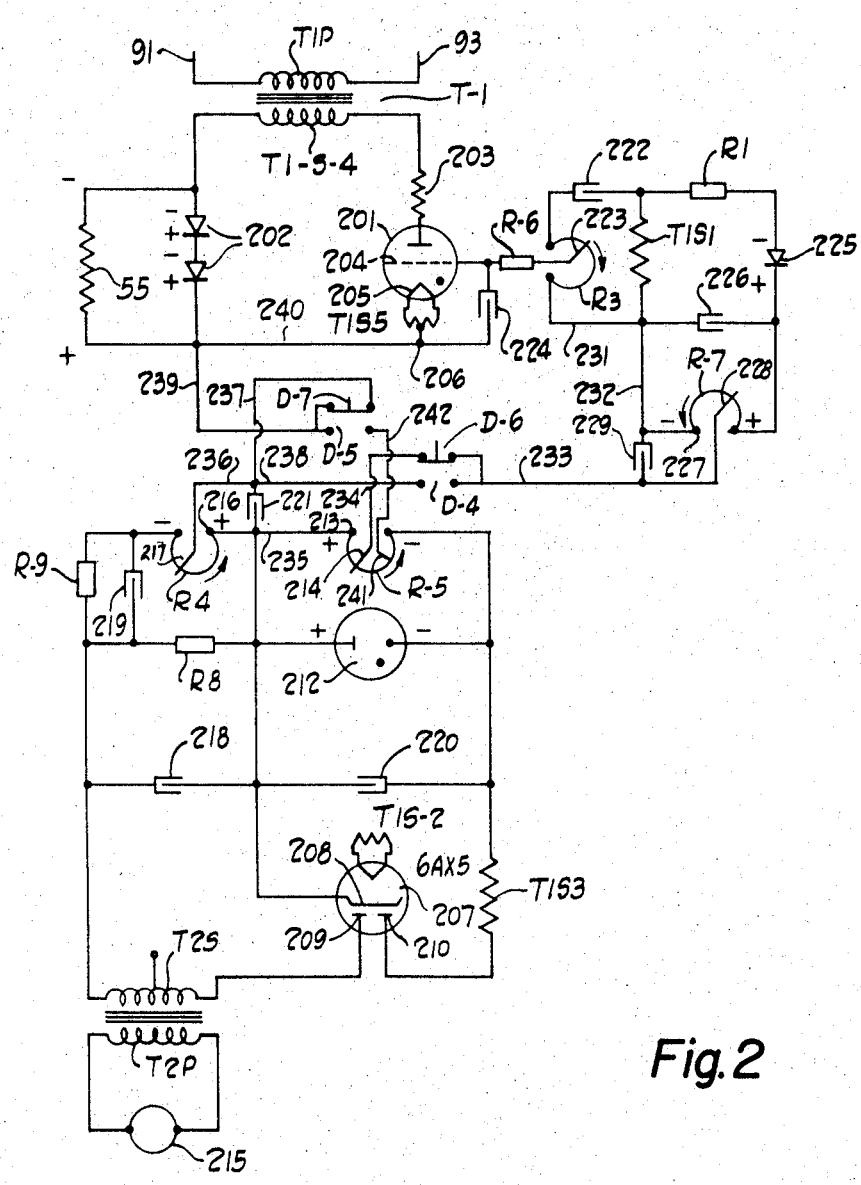
FIG. 2 is a circuit diagram of an arrangement for limiting the motor and flywheel speed to a predetermined value during idle periods of the press or other load driven by the motor and flywheel.

Referring now particularly to FIG. 1 there is shown at 1 a load of a type for which the required force or torque, which must be applied by a motor, fluctuates widely during an operating cycle and which may be at a standstill during portions of the operating cycle and may be idle for periods of time between successive operating cycles. A typical load of this type is a slide or ram of a press, which may be a press for punching or forming metal or the like. Such a ram is linked by a connecting rod or pitman 3 to the crank or eccentric 5 of a crank shaft or ram shaft 7.

The crank shaft is driven from a drive shaft 9 through speed reducing gears 11 and 13. The drive shaft 9 is adapted to be rotated by a motor 15 through an electromagnetic, eddy-current coupling 17. The coupling 17 is shown diagrammatically as being of the stationary field type. However, the invention is not limited thereto and does not exclude the use of other types of electromagnetic couplings such as the revolving field type coupling illustrated in Patent 2,630,467 Winther.

The coupling illustrated includes a coupling field 19 which, in the form of apparatus illustrated, is stationary and a driven inductor member 21. In order to produce the effect of a rotating field a toothed rotor 23 is provided, in the form of coupling illustrated, which is connected to the shaft 25 of the motor 15. Coupling apparatus of this type is sometimes referred to herein as an electromagnetic slip coupling or magnetic flux clutch. A flywheel 27 is also mounted upon the motor shaft 25 to which the toothed rotor 23 is connected.

The motor and flywheel shaft 25 is journaled in bearings 26; and the drive shaft 9 to which the inductor 21 is connected is journaled in a bearing 10. For better support the inductor 21 may also be journaled on bearings 12.

The inductor member 21 is adapted to be braked electromagnetically by a stationary braking field member 29. The combination of members 21 and 29 may be referred to as an electromagnetic brake or dynamic flux brake. This brakes the drive and crank shafts. The crank shaft is also under the control of a mechanical or a pneumatically operated brake 31 connected directly to the drive shaft 9. The crank shaft 7 is coupled by a one to one ratio chain and sprocket drive 33 to a cam shaft 35 of a group of cam operated switches 37, 39, 41, 43 and 45 which serve as limit switches, the precise function of which will be described subsequently.

The pneumatic brake 31 is shown as set by a spring 30 when a solenoid valve coil G is de-energized and air pressure is relieved from an air cylinder 32. When the coil G is energized the brake 31 is drawn open to release position against the action of its spring 30.

Since the present invention does not relate to the details of construction of the flywheel and electromagnetic clutch and electromagnetic brake assemblies, these are shown only schematically in the drawing of FIG. 1. As indicated, the flywheel 27 has a hub journaled in the bearings 26. The inductor 21 is journaled on bearings 10 and 12. There is a stationary casing 18 for the flywheel 27, the inductor 21 and the toothed rotor 23 as well as fields 19 and 29 both of which are stationary. The stationary, clutch field 19 has smooth pole faces so that a revolving magnetic field acting upon the inductor 21 is produced by the rotation of the toothed rotor 23. On the other hand the load brake field 29 is formed with radially inwardly extending pole teeth and braking action is exerted upon the inductor 21 when the load brake field 29 is energized.

It will be clear from the above description that when the motor 15 is energized to drive the flywheel 27 and the toothed rotor 23, and the coil 19 is energized the drive shaft 9 will be driven through the inductor 21 of the slip coupling and will drive crank shaft 7 to reciprocate the ram.

When the load brake field 29 is energized the drive shaft 9 will be braked to reduce the speed of rotation of the crank shaft 9. Then when the solenoid winding G is de-energized the brake 31 will be set to bring the drive shaft 9 and the crank shaft 7 to rest to stop the ram as well as stopping the inductor 21. If the coupling or clutch field 19 is also energized at this time, the coupling 17 will itself act as an electromagnetic brake to reduce the speed of the flywheel 27 and motor 15, so that the energy of the motor 15 and its power output will then be absorbed in the electromagnetic coupling 17 instead of being delivered to the press 1.

In carrying out the invention means are provided, when the pneumatic brake 31 is not set, for energizing the coupling field 19 to bring the inductor 21 and the drive shaft 9 as nearly as may be up to the speed of the flywheel 27 for delivering the kinetic energy of the flywheel and the power of the motor 15 to the load, in this case the press 1. On the other hand when the press 1 has reached the appropriate point in its stroke for being brought to rest and the pneumatic brake 31 is set, the control means for the coupling field 19 is reconnected for energizing this field only sufficiently, according to the speed of the shaft 25, for exerting a retarding torque upon the flywheel 27 and limiting the kinetic energy thereof to a value corresponding to a predetermined speed for which the control mechanism is set. For speed control, a tachometer 215 is connected to shaft 25 by a chain and sprocket drive 24. Thus, the control serves to maintain the flywheel 27 at a substantially fixed speed, holding the speed down substantially to the predetermined speed during idle periods and holding the speed, insofar as motor and coupling characteristics permit, up to the predetermined speed during working periods in the duty cycle of the press.

The motor 15 is described as an induction motor. However, the invention is useful also in systems driven by D.C. shunt motors, or other commutator motors or any other motors falling off in speed with load.

The invention will be described particularly in connection with a control setting for causing the press to run through one full stroke or cycle of the ram (one revolution of the crank shaft 7) and then to stop automatically. But the invention is adapted for use in apparatus such as that described in the aforesaid Winther Patent 2,630,467 in which the operator may selectively control the press to run through the one full stroke or cycle, or to cycle continuously without stopping between cycles, or to "inch" or creep by small increments through any portion of a cycle in either direction.

Figure 3:
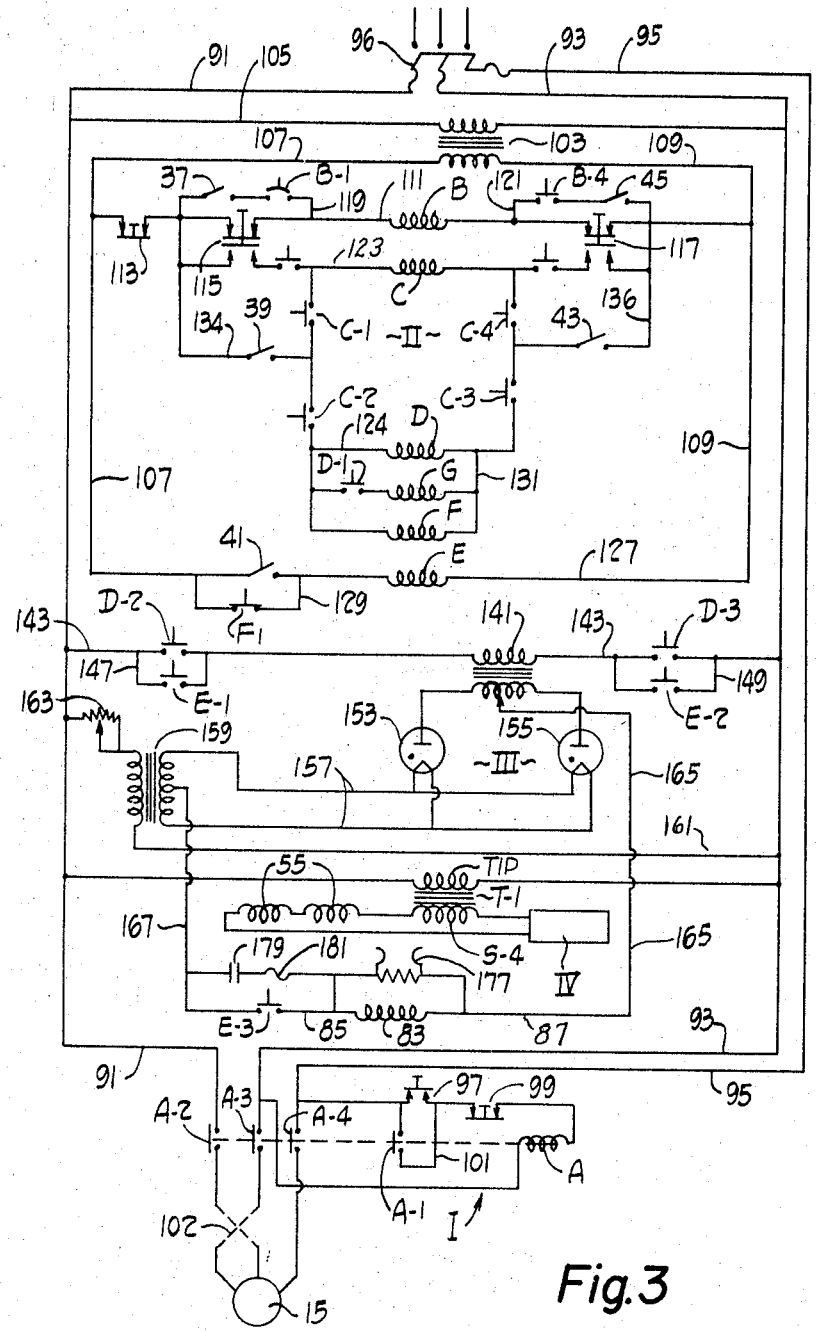
FIG. 3 is a circuit diagram of the entire control circuits for the motor when used in driving a press or other load of similar properties.

As illustrated in FIG. 3, the motor 15 is energized by a three-phase power line including wires 91, 93 and 95, a line switch 96 being included in the circuit. A motor control circuit I is connected across one phase of the power line designated by wires 93 and 95. This circuit includes a relay coil A, momentary push button make-and-break switches 97 and 99, respectively, and a shunt circuit 101 around switch 97 including contacts A–1. Contacts A–1, and also contacts A–2, A–3 and A–4 in series with wires 91, 93 and 95, respectively are grouped for simultaneous operation by relay coil A. When the coil is energized by pressing push buttom switch 97, it operates to close all of the contacts A-1, A-2, A-3 and A-4. This completes all phases of the circuit to motor 15 and establishes a holding circuit through closed contacts A-1 in shunt circuit 101 to maintain coil A energized even though the push button switch 97 is released. The motor 15 may be de-energized by momentarily pushing switch 99, which breaks the motor control circuit and de-energizes relay coil A to open contacts A-1, A-2, A-3 and A-4. A reversing switch 102 is provided in phase 91, 93 of the power supply so that the direction of rotation of motor 15 may be reversed when desired.

Power is derived from the three phase power supply to energize a system control circuit II and a rectifier III, the latter circuit supplying the rectified current to load brake field coils 83 of the braking field member 29. As will be explained more fully hereinafter there is also a speed responsive control circuit IV energized directly from lines 91 and 93 for supplying controlled, rectified current to field coils 55 of the coupling unit 19. The details of the circuit IV are shown in FIG. 2.

The control circuit II includes a plurality of relay coils B, C, D, E, F and G, each of which controls certain contacts associated therewith in a manner to be described. Power for energizing these relay coils is derived from the secondary winding of a step down transformer 103, the primary of which is in a line 105 connected across one phase 91, 93 of the three phase power supply. The secondary winding of the transformer 103 feeds wires 107 and 109.

The relay coil B when energized closes contacts B-1, B-2, B-3 and B-4 associated therewith for group operation. This coil is connected across wires 107 and 109 in a line 111 including a normally-closed push button switch 113 and two control switches 115 and 117. The control switches 115 and 117 are each double-pole, push button switches biased so that their upper contacts are closed in line 111. A circuit is completed from wire 107 through relay coil B to wire 109 through upper contacts of control switches 115 and 117. A line 119 shunted around control switch 115 includes the cam operated switch 37 and contacts B-1. A line 121 shunted around control switch 117 includes the cam operated switch 45 and contacts B-4. When coil B is energized contacts B-1 and B-4 are closed and these shunts function as holding circuits for coil B as long as cam operated switches 37 and 45 are closed, and the switches 115 and 117 may be operated without de-energizing coil B.

The relay coil C when energized closes contacts C-1, C-2, C-3 and C-4 associated therewith for group operation. This coil C is connected in parallel with coil B in a line 123 including lower contacts of control switches 115 and 117 and also the contacts B-2 and B-3. When the control switches 115 and 117 are pressed, the circuit through coil C is completed through the lower contacts of switches 115 and 117.

The relay coil D is connected in parallel with coil C and becomes energized when coil C is energized and closes all of contacts C-1, C-2, C-3 and C-4. Coil D is also connected in a line 124 in series with contacts C-2 and C-3.

The coil D when energized closes the contacts D-1 in the control circuit II, contacts D-2, D-3 in the rectifier circuit III, and normally open contacts D-4 and D-5 in the controlled rectifier circuit IV (FIG. 2), at the same time opening normally closed contacts D-6 and D-7, all of these contacts being associated with coil D for group operation. The coil D controls the energization of the field coil 55 of the slip coupling unit 19 in a manner to be described.

The relay coil E is connected in a line 127 across wires 107 and 109 including the cam operated switch 41. A shunt 129 around switch 41 includes contacts F-1. Coil E when energized closes contacts E-1, E-2 and E-3 in the rectifier circuit III and controls energization of the braking field coils 83.

The relay coil F is connected in a shunt circuit 131 around coil D that is energized whenever coil D is energized. Coil F controls contacts F-1. This pair of contacts is normally closed and opens when coil F is energized.

The solenoid coil G is connected across the shunt circuit 131 in a line including contacts D-1. This coil is energized when coil D is energized since contacts D-1 are closed under such conditions. Coil G is a control solenoid for the pneumatic brake 31 controlling the admission of air to the air cylinder 32 which releases the brake 31 by overcoming the force of the spring 30. Thus, when the coil G is energized the brake 31 is released. The arrangement whereby the coil releases the brake may, however, be of any suitable conventional form, of which the arrangement shown in FIG. 1 is only illustrative.

The cam operated switch 39 is connected in a line 134 adapted to shunt the bottom contacts of the control contacts 115 when switch 39 is closed. Similarly, the cam operated switch 43 is connected in a line 136 adapted to shunt the bottom contacts of the control switch 117 when switch 43 is closed.

As illustrated in the development of FIG. 4, the cams for the cam operated switches 37 to 45 are so designed and phased as to open switches 39 and 43 for the first 182° of the cycle of the crank shaft 7 and the press ram, to close these switches over the portion of the cycle between 182° and 245° and to open the switches from 245° to 360°. Switches 37 and 45 are closed by their cams for the first 225° of the press cycle, open from 225° to 270° and closed from 270° to 360°. The switch 41 is open for the first 195° of the press cycle, and closed for the remainder. The purpose for such timing will be made clear subsequently.

The rectifier circuit III derives power from the secondary winding of a transformer 141, the primary of which is connected in a line 143 across the phase 91, 93 of the three phase power supply. Included in the line 143 are contacts D-2, the primary of the transformer, and contacts D-3. A shunt 147 around the contacts D-2 includes contacts E-1.

The rectifier circuit III includes a pair of gas filled diodes 153 and 155. The anodes of these tubes are connected to the secondary winding of transformer 141. The cathodes of these tubes are in a heater circuit 157 energized by the secondary of a transformer 159. The primary of transformer 159 is in a line 161 connected across phase 91, 93 of the three phase power supply and including a rheostat 163 whereby the heater current of the cathodes may be varied.

When a circuit through line 143 is completed, the transformer 141 is energized and its secondary impresses a voltage on the anode of diode 153 that is 180° out of phase with the voltage impressed on the anode of the diode 155. Rectified output of the diodes is supplied to lines 165 and 167, connected to taps of the secondary transformers 141 and 159, respectively. These lines are adapted to supply the field coil 83 of the eddy current braking unit 29.

The braking field coil 83 is connected across lines 165 and 167 in a circuit including contacts E-3, wire 85, coil 83 and wire 87. The coil is protected from inductive kick by a thyrite resistor 177 in a shunt around the coil. The contacts E-3 are protected from overload and arcing by a condenser 179 and a fuse 181 in a shunt around the contacts.

The clutch field coils 55 are connected in series with the voltage responsive control unit IV to the secondary winding S-4 of a transformer T-1 having a primary winding TIP. The primary winding TIP is shown for convenience as being connected directly across the phase 91, 93. It will be understood, however, that the secondary winding S-4 may in practice, if desired, constitute an additional secondary winding of the transformer 141.

The control circuit for the winding 55 is shown in greater detail in FIG. 2. A current control device 201 such as a xenon gas filled thyratron tube is connected in series with the eddy current slip coupling coils 55 and the secondary winding T1S-4. Although a thyrite resistor may also be employed as shown in FIG. 2 to absorb inductive kick, one or more semi-conductor rectifier devices 202 in series are preferably connected across the eddy current coupling coil 55 to provide continued field current during nonconducting half-cycles of the thyratron 201 by utilizing the voltage induced in the winding 55. Speed responsive means are employed for controlling the average flow through the thyratron 201 and its voltage dropping resistor 203. This is accomplished by controlling the voltage supplied between the grid 204 of the thyratron 201 and the filament heater center tap 206 of the cathode 205. There is a tachometer generator circuit differentially connected with a reference voltage source in the grid cathode circuit of the thyratron 201.

For supplying the reference voltage a secondary winding T1S3 is provided on the transformer T1 connected to a twin diode rectifier tube 207 having a cathode 208 and a pair of anodes 209 and 210. The adjustable reference voltage source comprises a potentiometer R5 connected in series with the secondary winding T1S3, the anode 210 and the cathode 208 of the twin diode rectifier 207. Preferably, in order to maintain constancy of the reference voltage, a voltage regulator tube 212 such as a type VR105 regulator tube is also connected across the potentiometer R5. The connections are such that the terminal 213 of the potentiometer R5 is a positive terminal and the sliding contact or tap 214 is at negative potential with respect to the terminal 213.

For supplying a speed responsive voltage there is an alternating-current tachometer generator 215 preferably connected to a voltage step-up transformer T2 having a primary winding T2P connected across the winding of the tachometer generator 215 and a secondary winding T2S connected in series with the anode 209 and the cathode 208 of the twin diode 207 and a tachometer potentiometer R4. The latter has a positive terminal 216 connected to the positive terminal 213 of the reference voltage potentiometer R5, and has a sliding contact or tap 217. The connections are such that the sliding contact or tap 217 of the generator potentiometer R4 is negative with respect to the positive terminal 216. To avoid transient fluctuations in voltage, a stabilizing condenser 220 is connected across the potentiometer R5.

A filter condenser 218 is connected across the output of the rectifier supplied by the anode 209 of the twin diode rectifier 207. The potentiometer R4 serves for compensating for variations in characteristics of different tachometer generators such as the generator 215 and the reference voltage potentiometer R5 serves for setting the predetermined speed which the apparatus is intended to hold on the flywheel 27. The transformer T2 is a step up transformer to avoid the necessity for winding the tachometer generator 215 for the most efficient voltage for use in the control circuits.

A resistor R8 may be connected across the filter condenser 218. Preferably the potentiometer R4 is connected in a voltage divider circuit including a resistor R9 and the potentiometer R4 across the resistor R8. An acceleration responsive condenser 219 is connected across the resistor R9 to enable the apparatus to anticipate changes in flywheel speed.

There is a filter condenser 221, however, across the portion of the potentiometer R4 between the tap 217 and the positive terminal 216. The filtering action of the filter condenser 221 with the potentiometer R4 is provided to prevent overshooting of the set speed. The condenser 219 also serves to remove high frequency voltage that might be picked up by the control tending to fire the thyratron 201 indiscriminately and creating erratic drive speed.

It will be understood that it is a characteristic of thyratron tubes such as the tube 201, to remain conductive once they have been ignited until voltage is removed from the anode-cathode circuit and the grid 204 serves for exciting or igniting the tube when the potential thereof rises to a predetermined value in relation to the cathode, approximately zero or slightly negative with respect to zero depending upon the design of the tube.

In order to control the average current flow through the tube by setting the instant in the alternating-current wave when the tube 201 fires, a rider wave is provided in the grid-cathode circuit. The rider wave is provided by an auxiliary source of alternating current phased in quadrature to the voltage supplied in the anode-cathode circuit. For this purpose the transformer T1 which energizes the anode-cathode circuit is provided with a secondary winding T1S1 across which a potentiometer R3 is connected in series with a phase-shifting condenser 222. The potentiometer R3 has an adjustable tap 223, connected to the grid 204 of the thyratron 201 in series with a current limiting resistor R6.

Since the heater for the cathode 205 of the thyratron 201 is energized by another secondary winding T1S5 of the transformer T1, the center tap 206 of this winding serves effectively as the cathode connection for the grid-cathode circuit of the tube 201. A filter condenser 224 is preferably connected between the grid 204 and the heater-winding, center tap 206.

The transformer secondary winding T1S1 is utilized also for providing a source of adjustable bias voltage for the grid-cathode circuit of the tube 201. To this end there is a resistor R1 in series with a solid semiconductor rectifier 225 and a filter condenser 226 across the winding T1S1. A potentiometer R7 is connected across the rectified output filter 226. The connections are such that the terminal 227 of the potentiometer R7 is the negative terminal thereof. A filter condenser 229 is connected to the negative terminal 227 and to a tap 228 of the potentiometer R7. Thus, the setting of the tap 228 determines the magnitude of the negative bias applied to the grid 204 of the thyratron 201, serving also as the maximum speed adjustment.

The grid-cathode circuit of the tube 201 thus comprises the grid 204, the current limiting resistor R6 and the tap 223 of the potentiometer R3, conductors 231 and 232, the portion of the potentiometer R7 between the negative terminal 227 and the tap 228, a conductor 233, normally closed contacts D-6, a conductor 234, the tap 214 of the reference voltage potentiometer R5, the portion of the reference voltage potentiometer between the tap 214 and the positive terminal 213, the conductor 235, the positive terminal 216 of the potentiometer R4, the portion thereof between the terminal 216 and the adjustable tap 217, the conductor 236, then the conductor 237, the normally closed contacts D-7, the conductors 239 and 240 back to the cathode heater center tap 206 of the thyratron 201. As will be explained hereinafter the connections are such that with the contacts D6 and D7 in their normally closed position, as illustrated, increase in speed of the tachometer generator 215 above a predetermined value determined by the setting of the potentiometers and corresponding to the speed at which it is desired to maintain the flywheel 27 raises the potential of the grid 204 of the thyratron 201 above the firing level early in the alternating-current wave and causes current to flow through the eddy current coupling coils 55 to load down the motor 15 of the flywheel 27.

On the other hand when the coil D is energized so as to close the contacts D4 and D5 instead of the contacts D6 and D7 the grid-cathode circuit of the thyratron 201 obtains a voltage of opposite polarity from the differentially connected reference voltage and tachometer sources so as to energize the coupling field 55 and drive the load. To assure energization another tap 241 may be provided with reference voltage potentiometer R-5. The circuit is then traced from the grid 204 through elements, R6 to 223, R3, 231, 232, 227, R7, 228, 233, D-4, conductor 238, conductor 236, elements 217, R4, 216, 235, 213, R5, tap 241, conductor 242, contacts D–5, conductor 239, and conductor 240 back to the heater winding center 206 of the thyratron 201.

As shown in FIG. 5 the speed torque curve of an induction motor such as the motor 15 in which speed is plotted in a vertical direction and torque or load in the horizontal direction follows a line 247 which is substantially straight in the working portion of the curve that is up to full load, and droops somewhat from a maximum value at the point 243 on the vertical axis corresponding to zero load or running light. This is very nearly synchronous speed, representing only sufficient slip to supply the energy required for windage, bearing friction and field-excitation current copper loss.

At the full load point 244 the speed is less and if the motor and flywheel were allowed to rise to the no-load speed represented by the point 243 whenever press operation was interrupted for a shorter or longer period, the excess kinetic energy at the start of the cycle would vary from operation to operation depending upon how long the motor had been running light before resumption of press operation. This is what causes difficulty in bringing the press to a stop uniformly at the end of each working cycle.

The action depends upon the length of time between cycles and the time the motor has had to bring the flywheel up to higher speed. The braking force and the amount of energy that must be absorbed in the brake to bring the ram to a stop at the zero point in the cycle depends upon the initial speed of the apparatus when the brake was applied.

Accordingly, it is desired that the press start each stroke at a predetermined flywheel speed corresponding, e.g. to the point 245 on a speed torque curve 247 in order to obtain uniformity in the stopping time for a predetermined adjustment of the braking mechanism. Potentiometers R–4 and R–5 and taps 217 and 214 are so set that when the contacts D–4 and D–5 are closed the potentials at the taps 214 and 217 will be in balance, when the speed of the flywheel 27 and tachometer generator 215 is that corresponding to the point 245 on the speed-torque curve 247 of FIG. 5.

The auxiliary tap 241 on the reference voltage potentiometer R–5 may be set at such a value as to correspond to a point between the points 243 and 245 for example the point 246 on the speed-torque curve 247 so that the slip coupling 17 will be actuated to drive the shafts 9 and 7 and the ram of the press 1 when the contacts D–6 and D–7 are closed in their normal position, as illustrated in FIG. 2.

If it is desired to maintain speed control of the shaft 9 and the crank shaft 7 during the working portion of the cycle when the eddy-current brake unit 29 and the brake 31 are not functioning, and the contacts D–4 and D–5 are closed instead of the contacts D–6 and D–7, an additional tachometer generator corresponding to the generator 215 may be provided. Such an additional tachometer would be connected to the drive shaft 9 and supply a voltage through an adjustable potentiometer corresponding to the potentiometer R–4. The contacts D–4 would in such a case be included in a circuit to such a potentiometer instead of to the tap 217 of the potentiometer R–4 and the tap 241 would be set at the appropriate position on the potentiometer R–5.

Circuits have been illustrated and described for single cycle operation. It will be understood, however, that my invention is not limited thereto and that additional connections and switches and contacts may be provided as described for example in the aforesaid Winther Patent 2,630,467 for selective operation to run through one full stroke operating cycle and stop, or to run continuously, or to creep in either direction.

Operation is as follows:

To operate the press for single cycle (one reciprocation of the press ram and return), line switch 96 being closed, the push button switch 97 is pressed to energize the motor 15 and drive the toothed rotor 23, which reacts with the slip clutch field winding 19 to produce a revolving field reacting upon the inductor 21. At the start of the cycle, cam-operated switches 37 and 45 are closed, and switches 39, 41 and 43 are open. With control switches 115 and 117 in normal, upper position, a circuit through line 111 including coil B is complete. Coil B, being energized, closes contacts B–1, B–2, B–3 and B–4. With contacts B–1 and B–4 thus closed, the holding circuits 119 and 121 around control switches 115 and 117 are completed to maintain coil B energized.

To start the cycling of the press, the operator presses control switches 115 and 117 simultaneously. These control switches are so located that the operator must, as a safety measure, keep one hand on one switch and the other hand on the other switch, with both hands remote from the press ram. This closes the bottom contacts of control switches 115 and 117 and completes a circuit through line 123 and coil C, and contacts B–2 and B–3. Energization of the coil C closes contacts C–1, C–2, C–3 and C–4 and energizes coils D, G and F, as previously described. Coil G then closes the vent in the air line to the air cylinder 32 which compresses the brake-holding spring 30 to release the pneumatic brake 31 to permit the drive shaft 9 and the crank shaft 7 to rotate. Coil D closes contacts D–2 and D–3 to complete the circuit of primary winding of transformer 141 to provide rectified current for the electromagnetic eddy current brake field coils 83 (and also for the coils 55 in the event that the transformer secondary winding S–4 constitutes an additional secondary winding of the transformer 141 instead of constituting part of a second transformer with a primary connected directly across the phase 91, 93).

At the same time, coil D closes contacts D–4 and D–5, opening the contacts D–6 and D–7, (FIG. 2) in order to connect the reference voltage source and the speed or velocity voltage R–5 and R–4 with such polarity as to keep the field coils 55 energized, the voltage of the tap 241 being sufficient to overcome that of the tap 217 for any speed of the shaft 25 and tachometer 215. Coil F opens contacts, F–1 to de-energize coil E (switch 41 being open).

Referring to FIG. 2, with contacts D–4 and D–5 closed the heater winding center tap 206 of the thyratron 201 is connected through conductors 239, 240 contacts D–5 conductor 242 to the more negative tap 241, of the potentiometer R–5. Whereas the grid 204 of the thyratron 201 is connected through resistors R–6, potentiometer R–3, conductors 231 and 232, and condenser 229, conductor 233, contacts D–4, conductors 238 and 236 to the tap 217 of velocity potentiometer R–4. The tap 241 is set for a value closer to synchronous speed than the speed of the motor 15 set by the control circuit when contacts D–6 and D–7 are closed. The potential produced by the velocity potentiometer 217 is slightly less than that of the tap 241 of the reference voltage potentiometer R–5. Consequently, the thyratron 201 becomes conducting and causes current to flow through the eddy current slip coupling windings 55. Thus, the drive shaft 9 and the crank shaft 7 begin to rotate, and as the motor is loaded its slip increases and speed falls causing increased disparity between the potentials of the taps 217 and 241 and assuring continued increasing flow of current through the thyratron 201 and the slip coupling windings 55. Thus, the press is accelerated and driven from the motor 15 and the flywheel 27 through the slip coupling 17 to perform the punching, forming or like operation. The crank shaft 7 rotates cam shaft 35 at a 1:1 ratio.

The operator retains control switches 115 and 117 pressed in to keep their bottom contacts closed until the press has cycled at least through 182° and the ram has started its upward stroke. At 182°, cam operated switches 39 and 43 close, (see FIG. 4). The operator may now release control switches 115 and 117. This opens their bottom contacts. Switches 39 and 43, being closed, provide a shunt circuit to maintain coil C energized. This maintains coil D energized to keep its associated contacts D-1, D-2, D-3, D-4 and D-5 closed and maintain field coil 55 energized so that the clutch continues to drive the press.

When the press has cycled through 195°, cam operated switch 41 closes (FIG. 4). This completes the circuit through the coil E in line 127. Coil E then closes contacts E-1, E-2 and E-3. The circuit of the primary winding of transformer 141 is completed through contacts E-1 and E-2 as long as coil E is energized. Closure of contacts E-3 completes the circuit to the braking field coil 83 and energizes the braking field 29 to exert a braking action on inductor member 21.

When the press has cycled through 245°, cam operated switches 39 and 43 open (FIG. 4). This breaks the circuit of coil C and each of the coils C, D, F and G is de-energized. De-energization of coil D opens contacts D-1, D-2, D-3, D-4 and D-5 and closes contacts D-6 and D-7. Opening of contacts D-4 and D-5 and closing of contacts D-6 and D-7 reconnects the potentiometer voltages and their polarity in the grid cathode circuit of the thyratron 201. With the reversed polarity of these potentiometer voltages, the thyratron grid 204 remains unexcited for any speed of the motor 15 and the flywheel 27 below the predetermined value for which the tap 214 of the reference voltage potentiometer R-5 has been set. The motor having been under load, the speed tends to be below this predetermined value and accordingly, the electromagnetic clutch is de-energized and no further driving torque is exerted on the press.

De-energization of coil F closes contacts F-1 to complete the circuits through coil E and close contacts E-3 and energize the braking field coil 83. De-energization of coil G applies the pneumatic brake 31. The combined braking action brings the press to a stop after it has cycled through the remaining 115° to its initial position at zero degrees. It will be understood that the cam switches 37, 39, 41, 43 and 45 are so set as to bring about the braking action as soon as the ram in press 1 has completed its working stroke.

The return stroke accordingly is an idle period for the motor 15 and the flywheel 27. The braking action, bringing down the speed of the drive shaft 9, initially brings the speed of the flywheel and motor below that for which the thyratron 201 and the slip-coupling field coils 55 are energized with the contacts D-6 and D-7 closed. The thyratron 201 and its control circuits take charge of the control of the speed of the motor 15 and the flywheel 27 as soon as motor speed builds up to the predetermined value.

Although the motor now tends to be running light and to start to build up the speed and kinetic energy of the flywheel 27, so that this kinetic energy will be available for the next power stroke, as soon as the speed has reached the predetermined value for which the controls are set, the slip coupling 17 starts to exert braking action on the motor 17. The drive shaft 9 is now being held fast by the spring 30 of the brake 31. During normal and continuous operating action the design is such that the average load on the motor 15 and the flywheel 27 prevents them from going far beyond this predetermined speed before the beginning of the next power stroke.

However, if the operator does not immediately cause the apparatus to operate through another stroke there will be a tendency for the motor speed to build up still further until it had reached synchronous speed. With this excess kinetic energy in the flywheel, subsequent stopping cycles of the brakes would be erratic. This, however, is avoided because every power stroke begins with the same predetermined slip of the motor 15 and the speed of the motor 15 and the flywheel 27 regardless of the length of idle time which has elapsed since the last power stroke.

Thus, the control functions to release both the electromagnetic brake and the mechanical brake and to energize the slip coupling at the start of the next cycle or power stroke. The slip coupling exerts torque to drive the press over 245° of its cycle. The electromagnetic brake is applied, however, at 195°, just after the ram passes the midstroke, i.e. at the completion of the work movement. Thus, over the 50° of the cycle from 195° to 245° both the electromagnetic clutch and the brake are operative. This allows electromagnetic brake to attain a strong braking effort just as the clutch is released, thus assuring complete control. At 245° the clutch is cut out, but is reconnected as a speed limit brake, the electromagnetic brake remains applied, and the pneumatic brake is also applied. These brakes bring the press to a definite stop quite close to the end of the cycle at 0°. The pneumatic brake 31 provides the requisite reaction for the coupling acting as a speed-limit brake until the operator restarts the ram.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. A system for maintaining the speed of a flywheel substantially equal to a predetermined speed under no load conditions, said system comprising:
   means connected to said flywheel for rotating said flywheel on a shaft,
   an electromagnetic coupling connecting said flywheel to a load,
   means for generating a reference voltage the magnitude of which varies as a function of the predetermined speed of said flywheel,
   speed responsive means connected to said flywheel shaft for generating a second voltage the magnitude of which varies as a function of the speed of said flywheel,
   and means responsive to said reference voltage and said second voltage connected to said electromagnetic coupling for energizing said coupling when the speed of said flywheel exceeds the predetermined speed to brake said flywheel when said load is disconnected whereby the speed of said flywheel is maintained substantially equal to the predetermined speed.

2. A system as set forth in claim 1 wherein said load is a stamping press.

3. A system as set forth in claim 1 wherein said electromagnetic coupling comprises an eddy-current clutch and an eddy-current brake wherein the energization of said clutch operates to drive the load by said flywheel and the energization of the brake operates to disconnect the load from said flywheel.

4. A press drive system for maintaining the speed of a flywheel substantially equal to a predetermined speed under no load conditions, said system comprising:
   means connected to said flywheel for rotating said flywheel on a shaft,
   an electromagnetic coupling connecting said flywheel to a press load for driving said press load,
   means for generating a reference voltage the magnitude of which varies as a function of the predetermined speed of said flywheel,
   speed responsive means connected to said flywheel shaft for generating a second voltage the magnitude of which varies as a function of the speed of said flywheel,
   energizing means connected to said electromagnetic coupling for driving said press drive by said flywheel,
   means for disconnecting said press from said flywheel,
   and means responsive to said reference voltage and said second voltage connected to said electromagnetic coupling for energizing said coupling when the speed of said flywheel exceeds the predetermined speed to brake said flywheel when said press is disconnected, whereby the speed of said flywheel is maintained substantially equal to said predetermined speed under no load conditions.

5. A press drive system in claim 4 wherein said electromagnetic coupling comprises an eddy-current clutch and an eddy-current brake wherein the energization of the clutch operates to drive the press by said flywheel and the energization of the brake operates to disconnect the press from said flywheel and wherein said response means energizes the clutch when the speed of said flywheel exceeds the predetermined speed to brake said flywheel when the press is disconnected whereby the speed of said flywheel is maintained substantially equal to the predetermined speed under no load conditions.

References Cited

UNITED STATES PATENTS

| | | | |
|---|---|---|---|
| 2,471,505 | 5/1949 | Winther | 310—96 |
| 2,630,467 | 3/1953 | Winther | 310—94 |
| 2,806,967 | 9/1957 | Eck et al. | 310—94 |
| 2,809,312 | 10/1957 | Eck et al. | 310—94 |
| 2,941,137 | 6/1960 | Fehn | 318—161 |
| 2,740,510 | 4/1956 | Berthold | 310—95 |
| 3,024,395 | 3/1962 | Pedersen et al. | 310—95 |

ROBERT K. SCHAEFER, *Primary Examiner.*

HERMAN O. JONES, *Assistant Examiner.*